(12) United States Patent
Dorovsky et al.

(10) Patent No.: US 7,500,539 B1
(45) Date of Patent: Mar. 10, 2009

(54) METHOD AND APPARATUS OF USING CROSSED MAGNETIC FIELDS FOR MEASURING CONDUCTIVITY, PERMEABILITY AND POROSITY

(75) Inventors: Vitaly N. Dorovsky, Novosibirsk (RU); Kholmatzhon Imomnazarov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/847,920

(22) Filed: Aug. 30, 2007

(51) Int. Cl.
*G01V 1/40* (2006.01)
(52) U.S. Cl. .................. 181/102; 181/105; 367/25
(58) Field of Classification Search ............ 181/102, 181/105, 108; 367/25
See application file for complete search history.

(56) References Cited

U.S. PATENT DOCUMENTS

| | | | |
|---|---|---|---|
| 5,708,204 A | 1/1998 | Kasap | 73/152.52 |
| 5,852,262 A * | 12/1998 | Gill et al. | 181/106 |
| 6,247,542 B1 | 6/2001 | Kruspe et al. | 175/40 |
| 6,348,792 B1 | 2/2002 | Beard et al. | 324/303 |
| 2005/0007109 A1* | 1/2005 | Thomann et al. | 324/303 |
| 2005/0205268 A1* | 9/2005 | Engels et al. | 166/381 |
| 2007/0211572 A1* | 9/2007 | Reiderman et al. | 367/35 |

* cited by examiner

*Primary Examiner*—Louis M Arana
(74) *Attorney, Agent, or Firm*—Madan, Mossman & Sriram, P.C.

(57) ABSTRACT

When a static magnetic field and a crossed oscillating field are applied, the deformation rate at a boundary between a fluid and a porous medium depends on the amplitudes of the applied magnetic fields (to be exact, on their product), electric conductivity, porosity, and permeability. Knowing two of the three enables determination of the third. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

24 Claims, 4 Drawing Sheets

METHOD AND APPARATUS OF USING CROSSED MAGNETIC FIELDS FOR MEASURING CONDUCTIVITY, PERMEABILITY AND POROSITY

BACKGROUND OF THE PRESENT DISCLOSURE

1. Field of the Disclosure

The present disclosure relates generally to geological exploration in wellbores. More particularly, the present disclosure describes an apparatus, a machine-readable medium, and a method useful for obtaining measurements made in crossed-magnetic fields that can be used to determine formation properties.

2. Description of the Related Art

A variety of techniques are currently utilized in determining the presence and estimating quantities of hydrocarbons (oil and gas) in earth formations. These methods are designed to determine formation parameters, including, among other things, the resistivity, porosity, and permeability of a rock formation surrounding a wellbore drilled for recovering the hydrocarbons. Typically, the tools designed to provide the desired information are used to log the wellbore. Much of the logging is done after the wellbores have been drilled.

Extensive work has been done in the determination of formation properties using nuclear magnetic resonance (NMR) methods. In the NMR method, a magnetic field is applied to formation which aligns the nuclear spins in a direction parallel to the magnetic field. The formation is then pulsed with a pulsed radio frequency magnetic field orthogonal to the static magnetic field which changes the direction of the nuclear spins. Signals resulting from precession of the nuclear spins are measured, and with proper selection of the pulsing parameters, various formation properties such as porosity and diffusivity can be measured. There has been little recognition of measurements other than NMR measurements that can be made in crossed-magnetic fields. U.S. patent application Ser. No. 11/696,461 of Tabarovsky et al., having the same assignee as the present disclosure and the contents of which are incorporated herein by reference, teaches and claims a method of determining a resistivity parameter of an earth formation through casing using acoustic measurements in crossed-magnetic fields. The present disclosure is related to determination of other properties using measurements in crossed-magnetic fields.

SUMMARY OF THE DISCLOSURE

One embodiment of the disclosure is a method of evaluating an earth formation. A static magnetic field is produced in the formation from within a borehole and an oscillating magnetic field having a component substantially orthogonal to a direction of the static magnetic field is produced. Measurement is made of a velocity of motion of a wall of the borehole resulting from the produced oscillating magnetic field. Using an amplitude of the measured velocity of motion, and two of the following three quantities: (I) an electrical conductivity of the formation, (II) a porosity of the formation, and (III) a permeability of the formation, the third of the three quantities is estimated. The estimation of the third of the three quantities may be done using a product of a magnitude of the static magnetic field and a magnitude of the oscillating magnetic field. The third of the three quantities may be a permeability of the formation and the method may include measuring the porosity of the formation and measuring the electrical conductivity of the formation. The third of the three quantities may be the electrical conductivity of the formation and the method may include measuring the porosity of the formation and measuring the permeability of the formation. The third of the three quantities may be the porosity of the formation and the method may further include measuring the electrical conductivity of the formation and measuring the permeability formation. Producing the static magnetic field and the oscillating magnetic field may be done by positioning a magnet and an antenna coil on a pad in contact with a wall the borehole. Producing the static magnetic field and the oscillating magnetic field may be done by positioning a magnet and an antenna coil on a stabilizer in contact with the wall of the borehole. Producing the static magnetic field may be done using a magnet arrangement to provide an axisymmetric magnetic field. The oscillating magnetic field may produce a guided borehole wave. Estimating the third of the three quantities may be done by solving a biquadratic equation.

Another embodiment of the disclosure is an apparatus for evaluating an earth formation. The apparatus includes a magnet arrangement configured to produce a static magnetic field in the formation from within a borehole. An antenna is configured to produce an oscillating magnetic field having a component substantially orthogonal to a direction of the static magnetic field. An acoustic sensor is configured to provide a measurement of a velocity of motion of a wall of the borehole resulting from the produced oscillating magnetic field. The apparatus also includes a processor configured to use an amplitude of the measured velocity of motion and two of the following three quantities: (I) an electrical conductivity of the formation, (II) a porosity of the formation, and (III) a permeability of the formation, to estimate the third of the three quantities. The processor may be further configured to estimate the third of the three quantities by using a product of a magnitude of the static magnetic field and a magnitude of the oscillating magnetic field. The third of the three quantities may be include a permeability of the formation, and the apparatus may further include at least one device configured to measure the porosity of the formation and measure the electrical conductivity of the formation, and the processor may be further configured to use the output of the at least one device for estimating the permeability. The third of the three quantities may include an electrical conductivity of the formation, and the apparatus may further include at least one device configured to measure the porosity of the formation and measure the permeability of the formation. The third of the three quantities may include a porosity of the formation, and the apparatus may further include at least one device configured to measure the electrical conductivity of the formation and measure the permeability of the formation. The magnet and the antenna may be positioned on a pad in contact with a wall of the borehole. The magnet and antenna may be positioned on a stabilizer in contact with a wall of the borehole. The magnet arrangement may be further configured to produce an axisymmetric magnetic field which generates a guided borehole wave. The processor may be further configured estimate the third of the three quantities by solving a biquadratic equation.

Another embodiment of the disclosure is a computer readable medium for use with an apparatus for evaluating an earth formation. The apparatus includes a magnet arrangement configured to produce a static magnetic field in the formation from within a borehole. The apparatus also includes an antenna configured to produce an oscillating magnetic field having a component substantially orthogonal to a direction of the static magnetic field, and an acoustic sensor configured to produce a measurement of a velocity of motion of a wall of the borehole resulting from the produced oscillating magnetic field. The medium includes instructions which enable a processor to use an amplitude of the measured velocity of motion, a product of a magnitude of the static magnetic field and a magnitude of the oscillating magnetic field, and two of the following three quantities: (I) an electrical conductivity of the formation, (II) a porosity of the formation, and (III) a permeability of the formation, to estimate the third of said three quantities. The medium may include a ROM, an EPROM, an EPROM, a flash memory, and/or an optical disk.

BRIEF DESCRIPTION OF THE DRAWINGS

The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, wherein:

It is to be noted, however, that the appended drawings illustrate only typical embodiments of the present claimed subject matter and are, therefore, not to be considered as limiting the scope of the present claimed subject matter, as the present claimed subject matter may admit to other equally effective embodiments.

DETAILED DESCRIPTION OF THE DISCLOSURE

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
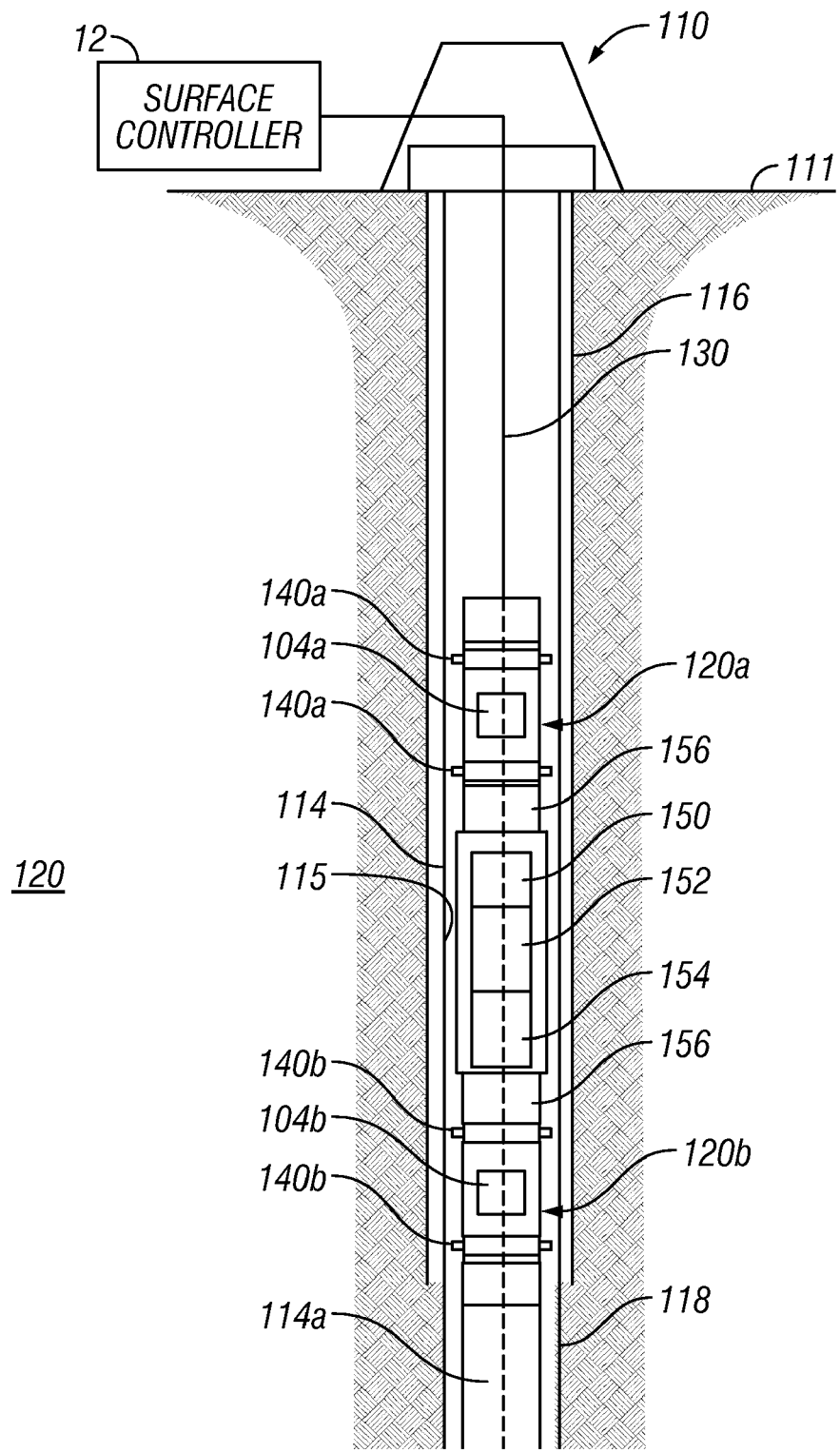
FIG. 1 shows an exemplary apparatus suitable for performing the method of the present disclosure conveyed within a wellbore having a casing.

FIG. 1 shows an exemplary apparatus suitable for performing the method of the present disclosure conveyed within a wellbore having a casing. FIG. 1 shows a rig 110 on a surface 111 and positioned over a subterranean earth formation of interest 120. The rig 110 may be a part of a land well production/construction facility or an offshore well production/construction facility. A wellbore 114 formed below the rig 110 may include a cased portion 116 and/or an open hole portion 118. In certain instances (e.g., during drilling, completion, work-over, and the like), a logging operation may be conducted to collect information relating to the earth formation 120 and/or the wellbore 114. Typically, a tool system 100 may be conveyed downhole via an umbilical 130 to measure one or more parameters of interest relating to the earth formation 120, such as resistivity. The term "umbilical" as used hereinafter includes a cable, a wireline, slickline, drill pipe, coiled tubing, or other devices suitable for conveying the tool system 100 into the wellbore 114. The tool system 100 may include one or more modules 102a, 102b each of which has a tool or a plurality of tools 104a, 104b adapted to perform one or more downhole tasks. The term "module" includes a device such as a sonde or sub that is suited to enclose or otherwise support a device that is to be deployed into the wellbore. While two proximally positioned modules and two associated tools are shown, it should be understood that any finite number may be used.

The tool 104a may be a formation evaluation (FE) tool adapted to measure one or more parameters of interest relating to the earth formation and/or the wellbore. The term formation evaluation (FE) tool encompasses measurement devices, sensors, and other like devices that, actively or passively, collect data about the various characteristics of the earth formation 120, directional sensors for providing information about the tool system 100 orientation or direction of movement, formation testing sensors for providing information about the characteristics of the reservoir fluid or for evaluating the reservoir conditions. The formation evaluation (FE) sensors may include resistivity sensors for determining the earth formation 120 resistivity or dielectric constant of the earth formation or the presence or absence of hydrocarbons; acoustic sensors for determining the acoustic porosity of the earth formation and the bed boundary in the earth formation; nuclear sensors for determining density of the earth formation, nuclear porosity and/or certain rock characteristics; or nuclear magnetic resonance (NMR) sensors for determining the porosity and/or other petrophysical characteristics of the earth formation. The direction and position sensors may include a combination of one or more accelerometers, gyroscopes, or magnetometers. The accelerometers preferably may provide measurements along three axes, in particular along three substantially mutually perpendicular axes. The formation testing sensors may collect earth formation fluid samples and determine the properties of the fluid, which may include physical or chemical properties. Pressure measurements may provide information about certain characteristics of the reservoir.

The tool system 100 may include telemetry equipment 150, a local or downhole processor or controller 152, and a downhole power supply 154. The telemetry equipment 150 may provide two-way communication for exchanging data signals between a surface controller or processor 112 and the tool system, as well as for transmitting control signals from the surface controller to the tool system.

A first module 102a may include a first tool 104a configured to measure a first parameter of interest and a second module 102b may include a second tool 104b that is configured to measure a second parameter of interest. In order to execute their assigned tasks, the first tool and the second tool may be in different positions. The positions can be with reference to an object such as the wellbore 114, a wellbore wall 115, or other proximally positioned tooling. The term "position" may be understood to encompass a radial position, an inclination, and/or an azimuthal orientation. In the illustration of FIG. 1, the longitudinal axis 114a of the wellbore ("the wellbore axis") is used as a reference axis to describe the relative radial positioning of the tools 104a, 104b. Other objects or points may also be used as a reference frame against which movement or position can be described. Moreover, the tasks of the tools may change during a wellbore-related operation. Generally speaking, the tool may be adapted to execute a selected task based on one or more selected factors. These factors may include, but may not be limited to depth, time, changes in earth formation characteristics, and/or the changes in tasks of other tools.

In an exemplary embodiment, the modules 102a and 102b may each be provided with positioning devices 140a, 140b, respectively, which are configured to maintain the respective modules 102a, 102b at selected radial positions relative to a reference position (e.g., the wellbore axis 114a). The positioning devices may also adjust the radial positions of the respective modules upon receiving one or more surface command signals or automatically in a closed-loop type manner. These selected radial positions may be maintained or adjusted independently of the radial position(s) of an adjacent downhole device (e.g., measurement tools, sonde, module, sub, or other like equipment). An articulated member, such a flexible joint 156 that couples the respective modules to the tool system may provide a degree of bending or pivoting to accommodate the radial positioning differences between adjacent modules or other equipment (for example, a processor sonde). One or more of the positioning devices may have fixed positioning members.

Figure 2:
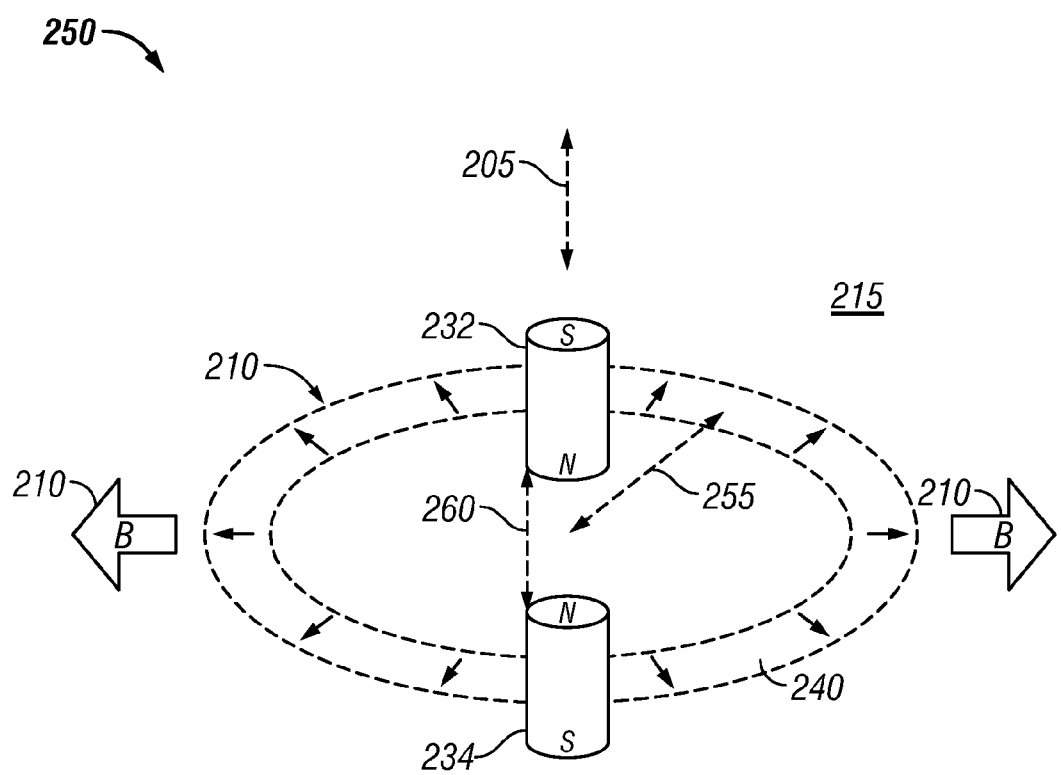
FIG. 2 schematically illustrates a magnet configuration of a resistivity apparatus suitable for use with the present disclosure.
Figure 3:
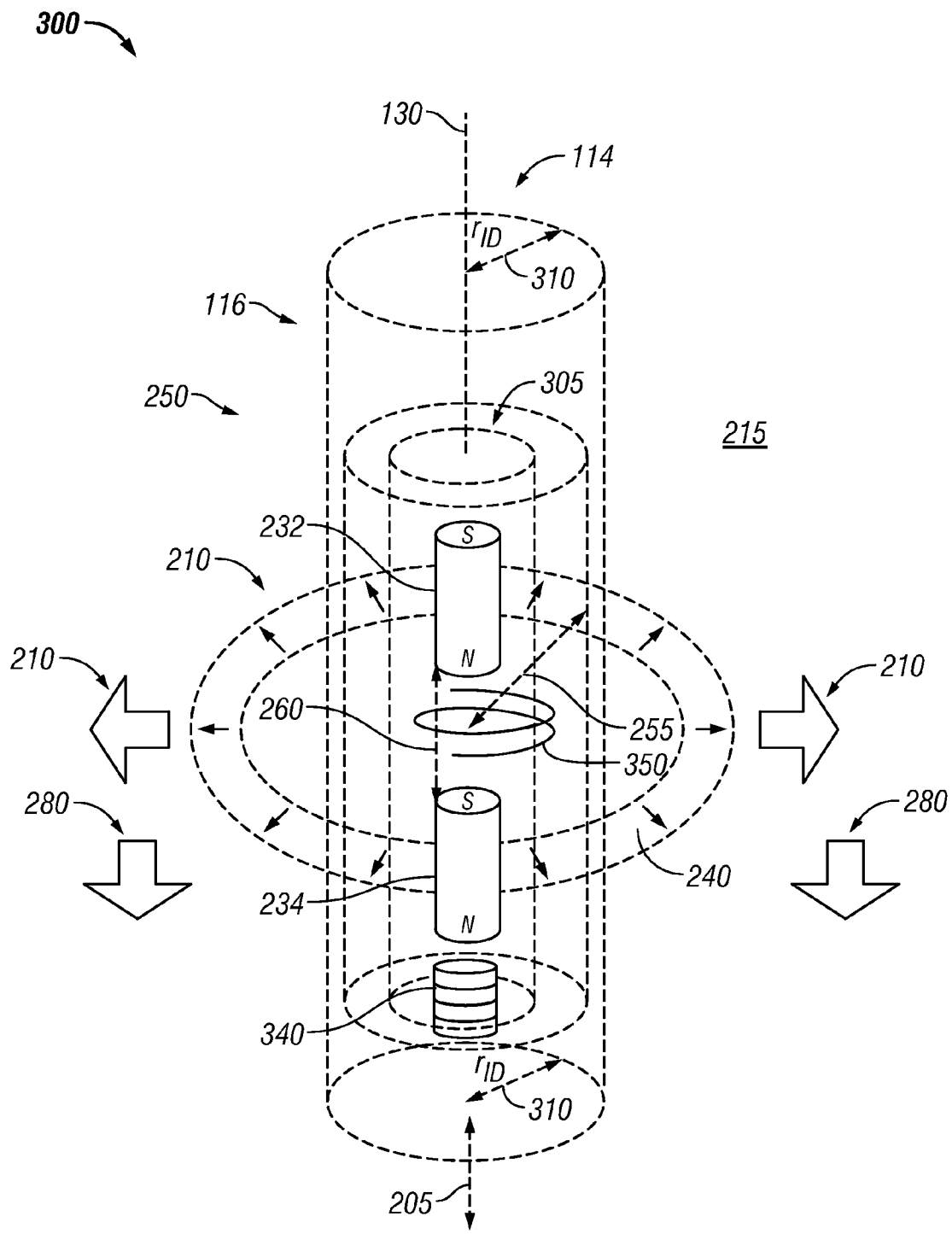
FIG. 3 schematically illustrates a resistivity apparatus suitable for use with the present disclosure, having the magnet configuration of FIG. 2.

FIG. 2 and FIG. 3 illustrate a magnetic field generator 250 of an illustrative device 305 suitable for use with the exemplary embodiment. One or more of magnets 232 and 234 may be magnetized in an axial direction along a vertical axis 205. The magnet may be positioned in opposing directions, with same magnetic poles, such as the north magnetic poles of the two magnets facing one another, thereby producing a toroidal region 240 of substantially homogeneous radial magnetic field 210 substantially perpendicular to the pair of axially aligned magnets. The one or more of the magnets may be electromagnets or permanent magnets. The applied static magnetic field may be generated using the one or more magnets. The orientation of the one or more magnets may be switched to reverse the orientation of the applied static magnetic field. The static magnetic field and the oscillating magnetic field produced by this configuration are axisymmetric. The oscillating magnetic field is produced by an antenna coil depicted by 350 and has the direction denoted by 280.

Distance 255 from substantially the middle of the toroidal region 240 to the vertical axis 205 may depend upon a distance 260 between respective faces of the like poles of the magnets 232 and 234. Rock pores (not shown) in an earth formation 215 may be filled with a fluid, such as water or hydrocarbons.

Referring next to FIG. 3, the device 305 described in Tabarovsky includes one or more acoustic receivers 340 capable of measuring a propagating acoustic wave in the borehole. The device 305 may also include a magnetic field generator 250 capable of applying the magnetic field 210 to the earth formation. The device 305 may also include the one or more processors (112, 152 of FIG. 1) capable of determining a parameter of the earth formation 215 from the measurements of the acoustic wave as discussed below. The method of the present disclosure does not need the acoustic transducers described in Tabarovsky for generating acoustic waves in the borehole.

The illustrative device 305 may be a component of a wireline measurement tool system 300 further including the wireline 130 and the rig 110 (FIG. 1) capable of conveying the resistivity device 305 into the borehole 114. Alternatively, the device may be part of a bottomhole assembly (BHA) conveyed on a drilling tubular into the borehole. Collectively, the wireline tool system and the BHA may be referred to as a downhole assembly.

Figure 4:
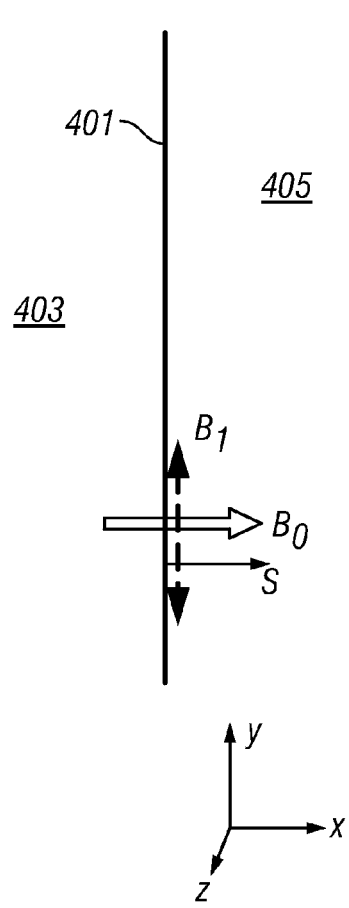
FIG. 4 schematically illustrates the coordinate system used in the discussion herein.

Turning now to FIG. 4, the coordinate system use in the discussion below is shown. 401 represents the interface between a fluid field borehole 403 and a porous formation 405. A static magnetic field $B_0$ is applied normal to the interface 401. An oscillating magnetic field $B_1$ is applied with a component parallel to the interface.

For the geometry shown, it can be shown that magnetoacoustic processes for the quasistationary electromagnetic field are described by this set of equations:

$$\ddot{u} - c_t^2 \Delta u - a_1 \nabla divu + a_2 \nabla divv - \frac{\sigma_s}{4\pi\sigma\rho_{0,s}} rot\dot{B}_1 \wedge B_0 + \frac{\rho_{0,l}^2}{\rho_{0,s}}\chi(\dot{u} - \dot{v}) = \quad (1)$$

$$0, \ddot{v} - a_4 \nabla divv + a_3 \nabla divu - \frac{\sigma_l}{4\pi\sigma\rho_{0,l}} rot\dot{B}_1 \wedge B_0 - \rho_{0,l}\chi(\dot{u} - \dot{v}) = 0,$$

$$\frac{\partial B_1}{\partial t} = rot\left[-\frac{c_e^2}{4\pi\sigma} rot B_1 + \frac{\sigma_s}{\sigma} u \wedge B_0 + \frac{\sigma_l}{\sigma} v \wedge B_0\right].$$

Here, u and v are velocities of the elastically deformed matrix and fluid in the x- and y-directions respectively, $B_0$ is the external static magnetic field, ^ is vector product, and $\sigma_s$ and $\sigma_l$ are conductivities of the matrix and a fluid, and $\rho_{0,s}$ and $\rho_{0,l}$ are respective partially densities.

Equations that for late the amplitude the amplitude of the magnetic field $B_1$ and velocities u and v contain four parameters $$a_1 = \frac{4}{3}c_t^2 + \frac{K}{\rho_{0,s}} - \frac{2K}{\rho_0} + \alpha_e\rho_{0,s}, a_2 = \frac{\rho_{0,l}}{\rho_0}\left(\frac{K}{\rho_{0,s}} - \alpha_e\rho_0\right),$$

$$a_3 = \frac{K}{\rho_0} - \alpha_e\rho_{0,s}, a_4 = \alpha_e\rho_{0,l}, \sigma = \sigma_l + \sigma_s, \rho_0 = \rho_{0,l} + \rho_{0,s}$$

determined by elastic modules $K=2\mu/3+\lambda$, $\mu$, $\alpha_e$, which, in their turn, are defined through two longitudinal $c_{l1}$, $c_{l2}$ and one transverse velocities of sound $c_t$ $$c_{l1}^2 = B_*\left(1 + \sqrt{1 - \frac{b_*}{B_*^2}}\right), c_{l2}^2 = B_*\left(1 - \sqrt{1 - \frac{b_*}{B_*^2}}\right), c_t^2 = \frac{\mu}{\rho_{0,s}},$$

where $$B_* = \frac{1}{2}\left(\alpha_e\rho_0 - \frac{2K}{\rho_0} + \frac{K}{\rho_0}\frac{2\mu + \lambda}{2\mu/3 + \lambda}\frac{\rho_0}{\rho_{0,s}}\right),$$

$$b_* = (2\mu + \lambda)\left(\frac{1}{\rho_{0,s}} - \frac{1}{\rho_0}\right)\left(\alpha_e\rho_0 - \frac{K^2}{\rho_0(2\mu + \lambda)}\right).$$

These equations contain a kinetic parameter $\chi$, which determined the force of friction between the matrix and the fluid.

In the simplest case of a nonconducting matrix ($\sigma_s$=0) of eqn. (1) the following 1D shape of amplitudes of propagation of magnetoacoustic waves is allowed:

$B_0=(B_0,0,0), B_1=(0,B_y,B_z),$ $v=(0,v_y,v_z), u=(0,u_y,u_z).$

In this case, as it follows from (1), equations split into a set of two groups of independent equations:

$$\ddot{u}_z - c_t^2 \frac{\partial^2 u_z}{\partial x^2} + \varepsilon\overline{\omega}(\dot{u}_z - \dot{v}_z) = 0,$$

$$\dot{v}_z - \frac{B_0}{4\pi\rho_{0,l}} \frac{\partial \dot{B}_z}{\partial x} - \overline{\omega}(\dot{u}_z - \dot{v}_z) = 0,$$

$$\frac{\partial B_z}{\partial t} = \frac{c_e^2}{4\pi\sigma} \frac{\partial^2 B_z}{\partial x^2} + B_0 \frac{\partial v_z}{\partial x},$$

$$\ddot{u}_y - c_t^2 \frac{\partial^2 u_y}{\partial x^2} + \varepsilon\overline{\omega}(\dot{u}_y - \dot{v}_y) = 0,$$

$$\dot{v}_y - \frac{B_0}{4\pi\rho_{0,l}} \frac{\partial \dot{B}_y}{\partial x} - \overline{\omega}(\dot{u}_y - \dot{v}_y) = 0,$$

$$\frac{\partial B_y}{\partial t} = \frac{c_e^2}{4\pi\sigma} \frac{\partial^2 B_y}{\partial x^2} + B_0 \frac{\partial v_y}{\partial x},$$

(2)

which describe propagation of independent elastic shear waves excited by the quasistationary magnetic field. Because the conductivity of the containing matrix is zero, shear waves in the system are caused by the force of friction between the fluid and the elastic matrix which contains it, $\overline{\omega} = \rho_{0,l}\chi$, $\varepsilon = \rho_{0,l}/\rho_{0,s}$.

Let us consider the first group of waves and discuss basic features of excitation of plane harmonic waves with angular frequency $\omega$:

$$(u_z, v_z, B_z) = (u_z, v_z, B_z) \cdot \exp(-i\omega t),$$

whose amplitudes depend on the coordinates as it is described by this set of differential equations:

$$\omega^2 u_z + c_t^2 \frac{\partial^2 u_z}{\partial x^2} + i\varepsilon\overline{\omega}\omega(u_z - v_z) = 0,$$

$$\omega v_z - i\frac{B_0}{4\pi\rho_{0,l}} \frac{\partial B_z}{\partial x} - i\overline{\omega}(u_z - v_z) = 0,$$

$$\frac{c_e^2}{4\pi\sigma} \frac{\partial^2 B_z}{\partial x^2} + B_0 \frac{\partial v_z}{\partial x} + i\omega B_z = 0.$$

(3)

As we derive the velocity of the fluid component from the second equation, $$v_z = \frac{i}{\omega + i\overline{\omega}} \frac{B_0}{4\pi\rho_{0,l}} \frac{\partial B_z}{\partial x} + \frac{i\overline{\omega}}{\omega + i\overline{\omega}} u_z,$$

it becomes convenient to express system (3) as a set of two equations:

$$\frac{\partial^2 u_z}{\partial x^2} + \frac{\omega^2}{c_t^2}\left(1 + \frac{i\varepsilon\overline{\omega}}{\omega + i\overline{\omega}}\right)u_z + \frac{\varepsilon\omega\overline{\omega}}{(\omega + i\overline{\omega})} \frac{B_0^2}{4\pi\rho_{0,l}c_t^2} \frac{\partial B}{\partial x} = 0,$$

$$\frac{i\overline{\omega}}{(\omega + i\overline{\omega})} \frac{\partial u_z}{\partial x} + D\frac{\partial^2 B}{\partial x^2} + i\omega B = 0.$$

(4)

Eqn. (4) defines a measureless magnetic field $$B_z = B_0 B$$

and this parameter $$D = \frac{c_e^2}{4\pi\sigma} + \frac{iB_0^2}{4\pi\rho_{0,l}(\omega + i\overline{\omega})}$$

The latter equation serves as the key equation for finding deformation rate of the matrix through the measureless magnetic field $$\frac{\partial u_z}{\partial x} = -\left(1 - i\frac{\omega}{\overline{\omega}}\right)D\hat{L}B$$

(5)

which, in turn, is found from a linear differential equation of the fourth order A linear differential operator is introduced into these equations $$\hat{L} = \frac{\partial^2}{\partial x^2} + \frac{i\omega}{D}$$

As we have the solution of equation (6) for the magnetic field, the deformation rate for the porous matrix is calculated by taking an integral (5). For an infinite half-space x>0 solutions which attenuate exponentially are of interest.

$$B \sim e^{-\beta x} \quad (7)$$

Substituting eqn. (7) into eqn. (6) gives a biquadratic algebraic equation for all possible exponents $\beta$. We are interested in solutions of this equation:

$$\left[\beta^2 + \frac{\omega^2}{c_t^2}\left(1 + \frac{\varepsilon i\overline{\omega}}{\omega + i\overline{\omega}}\right)\right]\left[\beta^2 + i\frac{\omega}{D}\right] = \frac{B_0^2}{4\pi\rho_{0,l}c_t^2} \frac{i\varepsilon\overline{\omega}^2\omega}{D(\omega + i\overline{\omega})^2}\beta^2,$$

(8)

containing positive real parts $$\beta = \{\beta_1, \beta_2\}. \text{ Re}\beta_1 0, \text{ Re}\beta_2 > 0.$$

The final way of writing out these solutions is convenient for calculating roots at small values of the external stationary longitudinal magnetic field $B_0$. Biquadratic eqn. (8) has two roots with positive real parts $$B = N_{1z}e^{-\beta_1 x} + N_{2z}e^{-\beta_2 x}.$$

Eqn. (5) enables us to write:

$$u_z = \left(1 - i\frac{\omega}{\overline{\omega}}\right)\frac{M_1}{\beta_1}N_{1z}e^{-\beta_1 x} + \left(1 - i\frac{\omega}{\overline{\omega}}\right)\frac{M_2}{\beta_2}N_{2z}e^{-\beta_2 x},$$

$$M_1 = D\beta_1^2 + i\omega, \quad M_2 = D\beta_2^2 + i\omega.$$

Constants $N_{1z}$, $N_2$, are determined from the boundary conditions $$N_{1z} + N_{2z} =$$

$$B_z(\omega)(x = 0) = \frac{B_{z0}(\omega)}{B_0}, \quad -\left(1 - i\frac{\omega}{\overline{\omega}}\right)M_1 N_{1z} - \left(1 - i\frac{\omega}{\overline{\omega}}\right)M_2 N_{2z} = 0.$$

The first condition identified the presence of the external and alternating magnetic field at the boundary surface x=0

The second condition means that no tangential forces are applied to the surface. Simple calculations enable us to write:

$$B_z = \frac{B_{z0}(\omega)}{D(\beta_1^2 - \beta_2^2)}(M_1 e^{-\beta_2 x} - M_2 e^{-\beta_1 x}).$$

-continued $$u_z = \frac{B_{z0}(\omega)}{DB_0}\left(1 - i\frac{\omega}{\overline{\omega}}\right)\frac{M_1 M_2}{\beta_2^2 - \beta_1^2}\left(\frac{e^{-\beta_1 x}}{\beta_1} - \frac{e^{-\beta_2 x}}{\beta_2}\right),$$

The first solution determines the process of how the alternating magnetic field penetrates the porous medium; the second determines acoustic waves generated during this process of penetration, in the presence of the stationary longitudinal (directed along the wave propagation axis) magnetic field. First, note that according to equation (8), this situation leads to excitation of two shear waves. A superposition of these waves gives the deformation rate for the matrix at the boundary x=0:

$$u_z(x=0) = \frac{B_{z0}(\omega)}{DB_0}\left(1 - i\frac{\omega}{\overline{\omega}}\right)\frac{M_1 M_2}{\beta_2^2 - \beta_1^2}\left(\frac{1}{\beta_1} - \frac{1}{\beta_2}\right)$$

Let us discuss dependence of the deformation rate upon the amplitude of the magnetic field at small values of this ratio $B_0^2/4\pi\rho_{0,t}c_t^2$. Eqn. (8) can be expressed as:

$$(\beta^2 + \lambda_1)(\beta^2 + \lambda_2) = \Sigma\Lambda_0\beta^2, \lambda_1 = \frac{\omega^2}{c_t^2}\left(1 + \frac{\varepsilon i\overline{\omega}}{\omega + i\overline{\omega}}\right), \quad (9)$$

$$\lambda_2 = i\frac{\omega}{D}, \sum = \frac{B_0^2}{4\pi\rho_{0,1}c_t^2}, \Lambda_0 = \frac{i\varepsilon\overline{\omega}^2\omega}{D(\omega + i\overline{\omega})^2}.$$

Roots can be expressed as a series for a dimensionless variable $\Sigma$:

$$\beta^2 = A_0 + A_1\Sigma + A_2\Sigma^{2+} \ldots$$

and expanded according to power $\Sigma$ $$\lambda_2 = \frac{4\pi\sigma\omega}{c_e^2}i + \frac{4\pi\sigma\omega}{c_e^2}\frac{4\pi\sigma c_t^2}{(\omega + i\overline{\omega})c_e^2}\sum + \ldots = \lambda_{20} + \lambda_{21}\sum + \ldots$$

In the zero order approximation, eqn. (9) becomes $$(A_0 + \lambda_1)(A_0 + \lambda_{20}) = 0,$$

i.e. in the zero-approximation we have two roots for $\beta^2$ $$\beta^2 = A_0 = -\lambda_1, \beta^2 = A_0 = -\lambda_{2,0}$$

In the next approximation we get:

$$\beta^2 = A_0 + \frac{\Lambda_0 A_0 - \lambda_{21}(A_0 + \lambda_1)}{(A_0 + \lambda_1) + (A_0 + \lambda_{20})}\sum.$$

Thus, we have two roots with linear accuracy for $\Sigma$ $$\beta_1^2 = -\lambda_1\left(1 + \frac{\Lambda_0}{-\lambda_1 + \lambda_{20}}\Sigma\right), \beta_2^2 = -\frac{\Lambda_0\lambda_{20} + \lambda_{21}(\lambda_1 - \lambda_{20})}{(-\lambda_{20} + \lambda_1)}\sum.$$

As we now have roots, let us calculate $M_1$, $M_2$ $$M_2 = \frac{\varepsilon\omega\overline{\omega}^2}{(\omega + i\overline{\omega})^2}\left(\frac{c_e^2\omega}{4\pi\sigma c_t^2} + i\frac{\varepsilon\omega\overline{\omega}c_e^2}{4\pi\sigma c_t^2(\omega + i\omega)} - i\right)^{-1}\sum,$$

-continued $$M_1 = \frac{c_e^2}{4\pi\sigma}(\lambda_{20} - \lambda_1).$$

In the expansion for $M_1$ only the main order is preserved. As a result, we get the following for this main order:

$$\frac{M_1 M_2}{D} = -\frac{4\pi\sigma\varepsilon\omega^2}{c_e^2}\frac{\overline{\omega}^2}{(\omega + i\overline{\omega})^2}\sum,$$

$$u_z(x=0) = i\frac{B_{z0}(\omega)B_0}{\rho_{0,s}c_t^2}\frac{\sigma\omega^2 c_e^{-2}}{\beta_1\beta_2(\beta_1 + \beta_2)}\frac{\overline{\omega}}{\omega + i\overline{\omega}}.$$

For fairly small amplitudes of the magnetic fields and $\overline{\omega}/\omega \gg 1$ we have $$\beta_1\beta_2 \sim -\frac{1+i}{\sqrt{2}}\sqrt{\frac{4\pi\sigma\omega^3}{c_e^2 c_t^2}}(1+\varepsilon)^{1/2},$$

$$\beta_1 + \beta_2 \sim \frac{\omega}{c_t}(1+\varepsilon)^{1/2}[a_0 - i(1+a_0)], a_0 = \sqrt{\frac{2\pi\sigma c_t^2}{(1+\varepsilon)c_e^2\omega}}.$$

In the same approximation we get this asymptotic formula:

$$u_z(x=0) = \sqrt{\frac{\sigma}{8\pi\omega}}\frac{B_{z0}(\omega)B_0}{\rho_0 c_e}\frac{\overline{\omega}/\omega}{a_0^2 + (1+a_0)^2}\frac{1 - i(1+2a_0)}{1 + i\overline{\omega}/\omega}, \quad (10)$$

$$|u_z(x=0)| = \frac{\sqrt{1+(1+2a_0)^2}}{a_0^2 + (1+a_0)^2}\sqrt{\frac{\sigma}{8\pi\omega}}\frac{|B_{z0}(\omega)|B_0}{\rho_0 c_e},$$

describing the behavior of the deformation rate of the porous matrix at the boundary.

Eqn. (10) gives the result that the deformation rate depends on the amplitudes of the applied magnetic fields (to be exact, on their product), electric conductivity, porosity, and permeability. Based on the realization, there are at least three methods of using the result.

In a first embodiment, knowing the amplitudes of the magnetic fields, porosity, and permeability, we can find the electric conductivity of the porous medium. The porosity may be determined using, for example, a neutron porosity logging tool; the permeability may be determined using flow tests. In a second embodiment, knowing the amplitudes of the magnetic fields, the electric conductivity and permeability, we can find porosity of the medium. In a third embodiment, knowing the amplitudes of the magnetic fields, porosity, and conductivity, we can find permeability of the medium. The third embodiment is probably of the most practical interest since permeability determination using flow tests is very time consuming. See, for example, U.S. Pat. No. 5,708,204 to Kasap. In each of the embodiments, the determined results may be recorded on a suitable medium. In each of the three embodiments, the determined results may be used in reservoir development and evaluation.

As an example, let the frequency of the excitation of the system be $\omega=62.8$ s$^{-1}$. The conductivity of the medium is $\sigma=10^{10}$ 1/s . Assuming the shear velocity of sound to be $c_t=10^5$ cm/s. We may estimate the electrodynamic constant to be $c_e=3\cdot10^{10}$ cm/s. The ratio of partial densities is $\epsilon=0.1$. In this case the value $a_0 \sim 0.14$, that is, very small. If magnetic fields $B_{z0}(\omega)$, $B_0 \sim 10^3 Gs$, then, for the density of the system $\rho_0 \sim 2.7$ g/cm$^3$, we get the deformation rate on the surface of the containing matrix $$|u_z(x=0)| \sim 3.7 \cdot 10^{-2} \text{ cm/s}.$$

Velocities of this magnitude are measurable. Further increase of the deformation rate may be related to the increase is related to the increase in amplitudes of the magnetic field, both alternating $B_{z0}(\omega)$ and stationary $B_0$. The side-looking wireline NMR tool disclosed in U.S. Pat. No. 6,348,792 to Beard et al., having the same assignee as the present disclosure and the contents of which are incorporated herein by reference, is capable of producing a static magnetic field of the order of 2000 Gauss and an RF magnetic field of the order of 20 Gauss, so that larger velocity of particle motion is possible. In the device of Beard, the magnet arrangement used to produce the static magnetic field and the antennas are on a body of the logging tool and can be positioned against the borehole wall.

Figure 5:
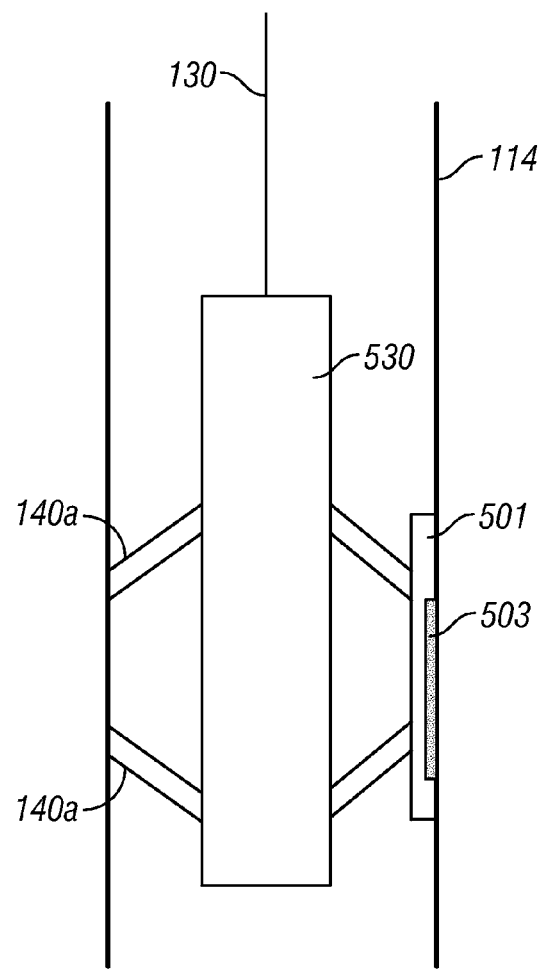
FIG. 5 shows an embodiment of the disclosure for wireline use with pad-mounted sensors.

There are different ways in which the method can be implemented. A simple wireline implementation is illustrated in FIG. 5. Shown therein is a logging tool 530 with sensor assembly 503 on a pad 501. The sensor assembly includes a magnet positioned to generate the static magnetic field $B_0$ and an antenna coil used to generate an oscillating magnetic field $B_1$. An MWD implementation (not shown) could have been sensors mounted on stabilizers.

The magnet configuration shown in FIG. 3 can be used in both wireline and MWD implementation. U.S. Pat. No. 6,247,542 to Kruspe et al., having the same assignee as the present disclosure and the contents of which are incorporated herein by reference, discloses a magnet configuration for NMR applications using a sleeve. The sensor assembly may be part of a bottomhole assembly conveyed on a drilling tubular. The same configuration may be used for the present disclosure. It should further be noted that while Kruspe discloses a non-rotating sleeve, this should not be construed as a limitation.

Those versed in the art would recognize that the shear wave produced by the method disclosed above would be a Stoneley wave. Furthermore, in the centralized tool configuration of FIG. 2 is used, the radial motion generated at the borehole wall would produce a borehole wave with radial motion. The borehole wave can be measured by the centralized detectors Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation permeabilities may be recorded on a suitable medium and used for subsequent processing upon retrieval of the BHA. The determined formation permeabilities may further be telemetered uphole for display and analysis.

What is claimed is:

1. A method of evaluating an earth formation, the method comprising:
   (a) producing a static magnetic field in the formation from within a borehole;
   (b) producing an oscillating magnetic field having a component substantially orthogonal to a direction of the static magnetic field;
   (c) measuring a velocity of a motion of a wall of the borehole resulting from the produced oscillating magnetic field; and
   (d) using an amplitude of the measured velocity of motion, and two of the following three quantities: (A) an electrical conductivity of the formation, (B) a porosity of the formation, and (C) a permeability of the formation, to estimate the third of said three quantities.

2. The method of claim 1 wherein estimating the third of the three quantities further comprises using a product of a magnitude of the static magnetic field and a magnitude of the oscillating magnetic field.

3. The method of claim 1 wherein the third of said three quantities comprises the permeability of the formation, the method further comprising measuring the porosity of the formation and measuring the electrical conductivity of the formation.

4. The method of claim 1 wherein the third of the three quantities comprises the electrical conductivity of the formation, the method further comprising measuring the porosity of the formation and measuring the permeability of the formation.

5. The method of claim 1 wherein the third of the three quantities comprises the porosity of the formation, the method further comprising measuring the electrical conductivity of the formation and measuring the permeability of the formation.

6. The method of claim 1 wherein producing the static magnetic field and the oscillating magnetic field further comprises positioning a magnet and an antenna coil on a pad in contact with a wall of the borehole.

7. The method of claim 1 wherein producing the static magnetic field and the oscillating magnetic field further comprises positioning a magnet and an antenna coil on a stabilizer in contact with a wall of the borehole.

8. The method of claim 1 wherein producing the static magnetic field further comprises using a magnet arrangement to provide an axisymmetric magnetic field.

9. The method of claim 8 wherein the oscillating magnetic field produces a guided borehole wave.

10. The method of claim 1 wherein estimating the third of the three quantities further comprises solving a biquadratic equation.

11. An apparatus for evaluating an earth formation, the apparatus comprising:
   (a) a magnet arrangement configured to produce a static magnetic field in the formation from within a borehole;
   (b) an antenna configured to produce an oscillating magnetic field having a component substantially orthogonal to a direction of the static magnetic field;
   (c) an acoustic sensor configured to provide a measurement of a velocity of motion of a wall of the borehole resulting from the produced oscillating magnetic field; and
   (d) a processor configured to:
      use an amplitude of the measured velocity of motion, and two of the following three quantities: (I) an electrical conductivity of the formation, (II) a porosity of the formation, and (III) a permeability of the formation, to estimate the third of said three quantities.

12. The apparatus of claim 11 wherein the processor is configured to estimate the third of said three quantities by using a product of a magnitude of the static magnetic field and a magnitude of the oscillating magnetic field.

13. The apparatus of claim 11 wherein the third of said three quantities comprises the permeability of the formation, the apparatus further comprising at least one device configured to measure the porosity of the formation and to measure the electrical conductivity of the formation;

wherein the processor is further configured to use the output of the at least one device for estimating the permeability.

14. The apparatus of claim 11 wherein the third of the three quantities comprises the electrical conductivity of the formation, the apparatus further comprising devices configured to measure the porosity of the formation and measure the permeability of the formation.

15. The apparatus of claim 11 wherein the third of the three quantities comprises the porosity of the formation, the apparatus further comprising devices configured to measure the electrical conductivity of the formation and measure the permeability of the formation.

16. The apparatus of claim 11 wherein the magnet and the antenna are positioned on a pad in contact with a wall of the borehole.

17. The apparatus of claim 11 wherein the magnet and the antenna are positioned on a stabilizer in contact with a wall of the borehole.

18. The apparatus of claim 11 wherein the magnet arrangement is configured to provide an axisymmetric magnetic field.

19. The apparatus of claim 18 wherein the antenna is further configured to produce an oscillating magnetic field which generates a guided borehole wave.

20. The apparatus of claim 11 wherein the magnet arrangement is configured to be positioned adjacent to a wall of the borehole.

21. The apparatus of claim 11 wherein the processor is further configured to estimate the third of the three quantities by solving a biquadratic equation.

22. The apparatus of claim 11 further comprising a conveyance device configured to convey the magnet arrangement and the antenna into the borehole, the conveyance device being selected from: (i) a wireline, and (ii) a bottomhole assembly on a drilling tubular.

23. A computer-readable medium for use with an apparatus for evaluating an earth formation, the apparatus comprising:
   (a) a magnet arrangement configured to produce a static magnetic field in the formation from within a borehole;
   (b) an antenna configured to produce an oscillating magnetic field having a component substantially orthogonal to a direction of the static magnetic field; and
   (c) an acoustic sensor configured to produce a measurement of a velocity of a motion of a wall of the borehole resulting from the produced oscillating magnetic field;
   the medium comprising instructions which enable a processor to:
   (d) use an amplitude of the measured velocity of motion, a product of a magnitude of the static magnetic field and a magnitude of the oscillating magnetic field, and two of the following three quantities: (I) an electrical conductivity of the formation, (II) a porosity of the formation, and (III) a permeability of the formation, to estimate the third of said three quantities.

24. The medium of claim 23 further comprising at least one of (i) a ROM, (ii) an EPROM, (iii) an EAROM, (iv) a flash memory, and (v) an optical disk.

* * * * *